United States Patent [19]
Cheng et al.

[11] Patent Number: 6,013,894
[45] Date of Patent: Jan. 11, 2000

[54] METHOD AND APPARATUS FOR LASER TEXTURING A MAGNETIC RECORDING DISK SUBSTRATE

[75] Inventors: Zheng Da Cheng, San Jose; Yi Wei Xia, Cupertino, both of Calif.

[73] Assignee: Laserway, Inc., Fremont, Calif.

[21] Appl. No.: 09/020,491

[22] Filed: Feb. 9, 1998

Related U.S. Application Data

[60] Provisional application No. 60/038,148, Feb. 10, 1997.

[51] Int. Cl.⁷ .................................................. B23K 26/00
[52] U.S. Cl. ............................. 219/121.69; 219/121.76; 219/121.82; 414/938
[58] Field of Search ..................... 219/121.68, 121.69, 219/121.76, 121.82; 198/436.2; 414/744.2, 744.3, 938, 941; 360/103, 135; 901/17, 47; 427/555

[56] References Cited

U.S. PATENT DOCUMENTS

| | | | |
|---|---|---|---|
| 4,886,412 | 12/1989 | Wooding et al. | 414/938 |
| 5,299,901 | 4/1994 | Takayama | 414/938 |
| 5,425,611 | 6/1995 | Hughes et al. | 414/938 |
| 5,567,484 | 10/1996 | Baumgart et al. | 427/555 |
| 5,658,475 | 8/1997 | Barenboim et al. | 219/121.68 |

FOREIGN PATENT DOCUMENTS

| | | |
|---|---|---|
| 3636602 | 6/1987 | Germany . |
| 8-227521 | 9/1996 | Japan . |

*Primary Examiner*—Geoffrey S. Evans
*Attorney, Agent, or Firm*—Claude A. S. Hamrick; Oppenheimer W. Donnelly; Chien-Wei (Chris) Chou

[57] ABSTRACT

Method and apparatus for laser texturing a magnetic recording disk substrate, including a disk-loading and unloading conveyer, a pair of disk-carrying spindles and associated laser systems disposed in spaced-apart relationship, and a disk-handling mechanism disposed between the conveyer and the set of spindles and operative to obtain a first disk rom the conveyer, place it on a first spindle for texturing on one side, remove the partially textured first disk from the first spindle, flip it upside down and place it on a second spindle for texturing on the other side, while at the same time obtaining a second disk from the conveyor and loading it onto the first spindle for texturing on one side. A third disk is then removed from the conveyor and loaded onto the first spindle as the second disk is removed therefrom, flipped over and placed on the second spindle as the first disk is removed therefrom and returned to the conveyor. After the first disk is returned to the conveyor, one fully textured disk is returned to the conveyor following each texturing cycle.

51 Claims, 5 Drawing Sheets

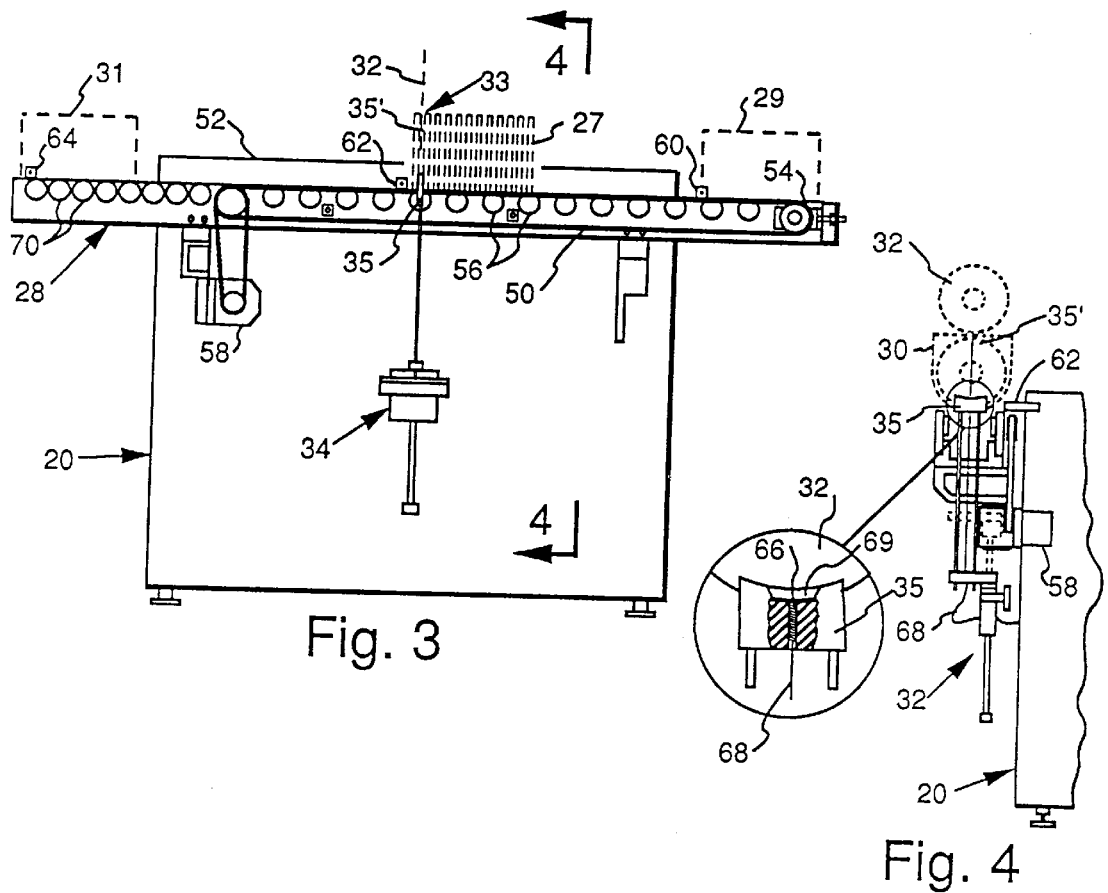
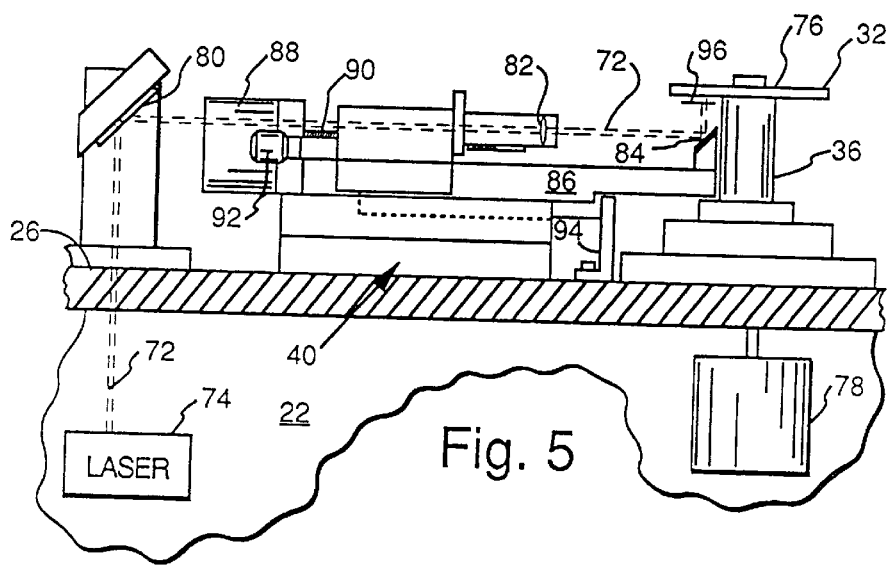

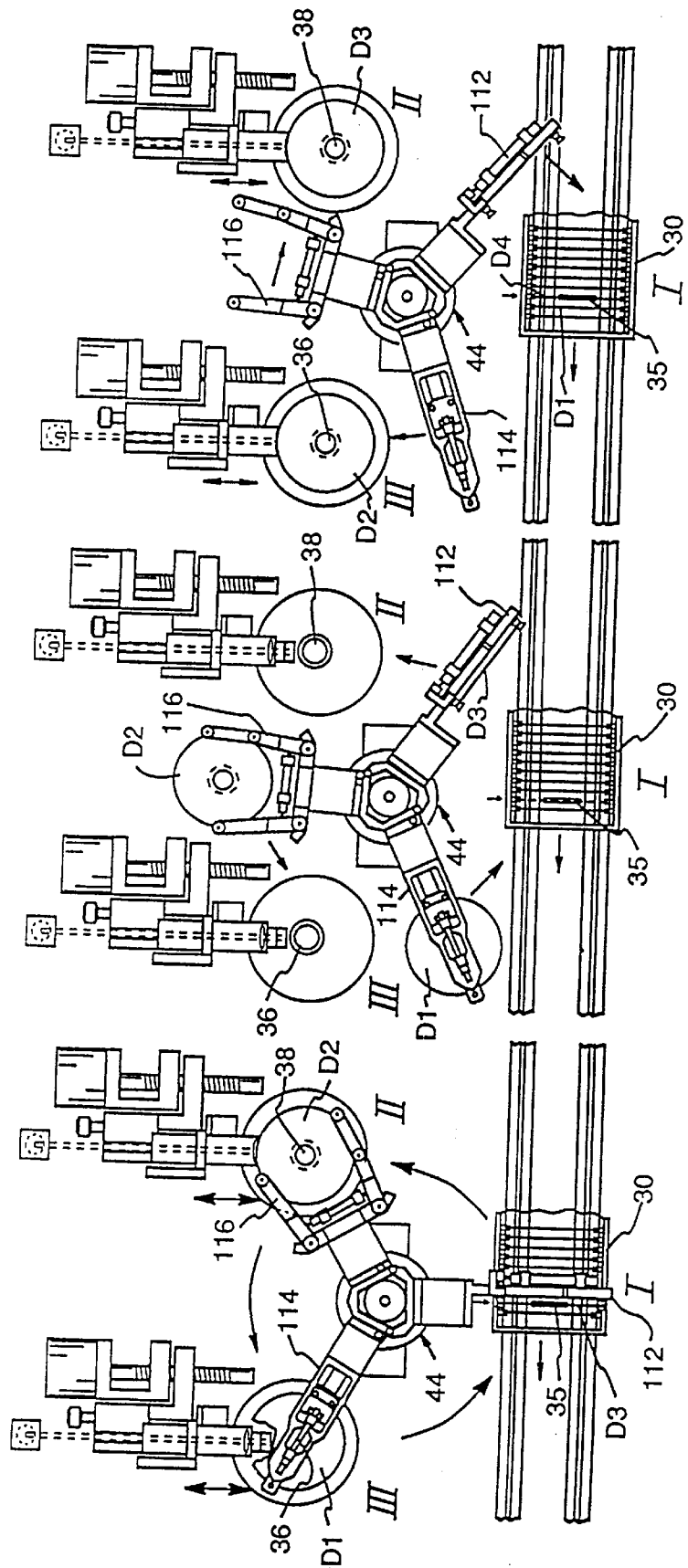

METHOD AND APPARATUS FOR LASER TEXTURING A MAGNETIC RECORDING DISK SUBSTRATE

CROSS-REFERENCE TO RELATED APPLICATIONS

Reference is made to and priority claimed from U.S. Provisional Application Ser. No. 60/038,148, filed Feb. 10, 1997, entitled "Method and Apparatus for Laser Texturing a Magnetic Recording Disk Substrate."

BACKGROUND OF THE INVENTION

1. Field of the Invention

The present invention relates generally to methods and apparatus for texturing planar surfaces, and more particularly to an improved method and apparatus for laser texturing a magnetic recording disk substrate.

2. Description of the Prior Art

Conventional magnetic recording disk drives utilize a rigid rotatable disk, such as that shown at 10 in FIG. 1, having concentric data tracks 12 for storing recorded information and use a transducing head (not shown) which "flies" over the surface of the disk to read and/or write data onto the several tracks. The head is carried by an air-bearing slider that rides above the disk when the disk is rotating at its operational speed. The slider is typically carried by a flexible suspension that is biased toward the disk surface by a small spring force.

Disk drives known as contact start/stop (CSS) drives permit contact between the slider and the disk surface during stop and start operations when there is insufficient rotational speed to maintain the air-bearing separation therebetween. The disk surface is typically made as smooth as possible to improve wear resistance and preserve uniform magnetic properties. However, after a slider has been in stationary contact with a smooth disk surface for a period of time, a problem known as "stiction", caused by a variety of factors including static friction and adhesion forces between the disk and slider, can result in damage to the head or the disk when disk rotation is initiated. Furthermore, the rather fragile suspension used to support the slider is also subject to damage as the head is held back by stiction and then released from engagement with the disk as disk rotation is initiated.

In order to minimize the stiction effects, CSS drives often use a dedicated textured "landing zone" 14 near the center opening 16 so that the slider may be parked when the drive is not operational. This landing zone is comprised of a specially textured region of the disk wherein no data is stored and is typically textured before deposition of the magnetic layer and subsequent layers that make up the finished disk. However, these following layers are normally quite thin and replicate the texture of the underlying substrate. The resulting textured surface tends to reduce the stiction forces that would otherwise be encountered when the slider is in engagement with the disk.

Texturing of the disk substrate is often accomplished by focusing a pulsed laser onto the surface of a spinning disk with sufficient intensity to locally melt small portions 18 of the substrate which, upon cooling and resolidifying, leave geometric variations in the surface topography of the substrate. The characteristics of the resulting geometric variations, or texture features, are a unction of laser pulse-width, spot size and shape, and spot energy, and are usually in the form of craters or bumps formed in the substrate.

Two types of laser texturing apparatus are generally used. In one type, the disk is placed upon a spindle and rotated as a pulsed laser beam is focused on the areas of the disk to be textured. The disk is then removed from the spindle, flipped over and returned to the spindle to texture the opposite side. In a second type of apparatus, separate laser systems are simultaneously focused onto the top and bottom surfaces of the disk as it is rotated on a spindle.

The problem with the first type of apparatus is that its throughput is low because it takes two texturing cycles to complete a single disk. The second type of apparatus overcomes the throughput problem, since only one texturing cycle is required per disk, but suffers the disadvantage that, because all disks are not of exactly the same thickness, accurate focus of at least one of the laser beams requires the use of a precision autofocusing system. Furthermore, to permit loading and off-loading of the disk to a spindle without interfering with the laser optics requires that complex positioning mechanisms must be provided in order to both clear the optics of the disk during transfer and to step the laser beams with precision during the texturing operation.

SUMMARY OF THE INVENTION

It is therefore an objective of the present invention to provide an improved method and apparatus for laser texturing magnetic disks using relatively simple mechanical, electrical and optical apparatus.

Another objective of the present invention is to provide a method and apparatus of the type described which in operation simultaneously inputs and outputs one disk per texturing cycle.

A further objective of the present invention is to provide a method and apparatus of the type described which, once set up, requires no further optical alignment operation during a process run.

Briefly a preferred embodiment of the present invention includes a disk-loading and unloading conveyer, a pair of disk-carrying spindles and associated laser systems disposed in spaced-apart relationship, and a disk-handling mechanism disposed between the conveyer and the set of spindles and operative to obtain a first disk from the conveyer, place it on a first spindle for texturing on one side, remove the partially textured first disk from the first spindle, flip it upside down and place it on a second spindle for texturing on the other side, while at the same time obtaining a second disk from the conveyor and loading it onto the first spindle for texturing on one side. A third disk is then removed from the conveyor and loaded onto the first spindle as the second disk is removed therefrom, flipped over and placed on the second spindle as the first disk is removed therefrom and returned to the conveyor. After the first disk is returned to the conveyor, one fully textured disk is returned to the conveyor following each texturing cycle.

A principal advantage of the present invention is that, in operation, the apparatus will process and output one disk per texturing cycle and therefore have an optimum throughput characteristic.

Another advantage of the present invention is that relatively simple mechanisms are used to unload disks from the conveyer, process the disks, and then return the textured disks to the conveyer in a substantially continuous operation.

A further advantage of the present invention is that, once aligned, no further focusing adjustment need be made to the laser apparatus in order to assure optimum focusing of the laser beam onto the disk surface.

These and other objects and advantages of the present invention will no doubt become apparent to those skilled in the art after having read the following detailed description of the preferred embodiment illustrated in the several figures of the drawing.

IN THE DRAWING

FIG. 3 is a side elevational view depicting the operative components of the disk-carrying cassette conveyer and disk loader/off-loader mechanism of FIG. 2;

FIG. 4 is a partially broken cross-section taken along the line 4—4 of FIG. 3;

FIG. 5 is a side elevational view illustrating the laser beam directing optics and spindle components of FIG. 2;

FIGS. 9a–9c are plan views illustrating operation of the disk transfer mechanism and the laser beam directing components of the preferred embodiment.

DETAILED DESCRIPTION OF THE PREFERRED EMBODIMENTS

Figure 1:
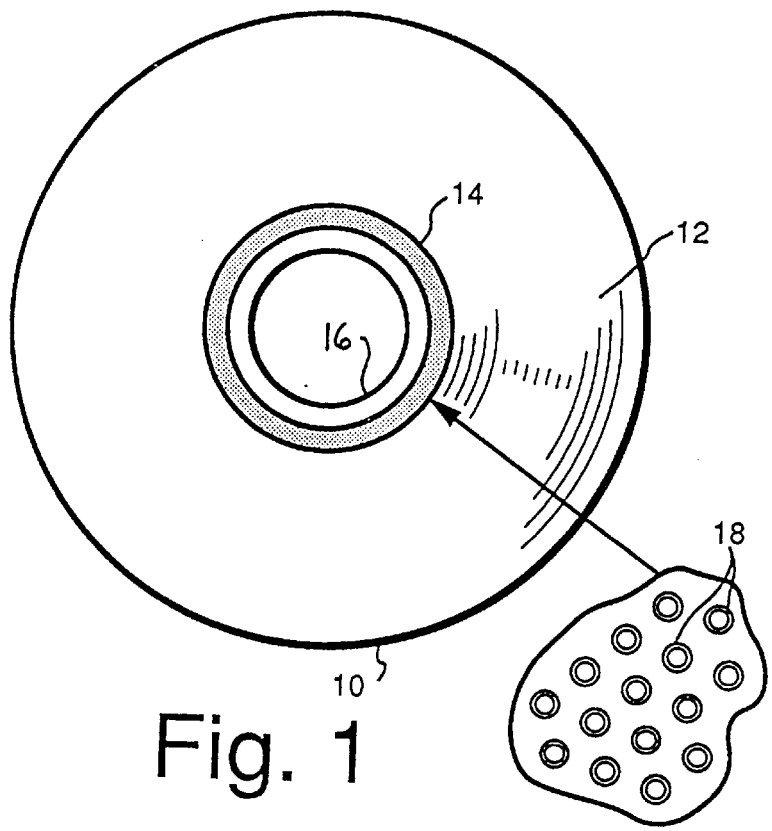
FIG. 1 illustrates a magnetic storage disk having a textured region.
Figure 2:
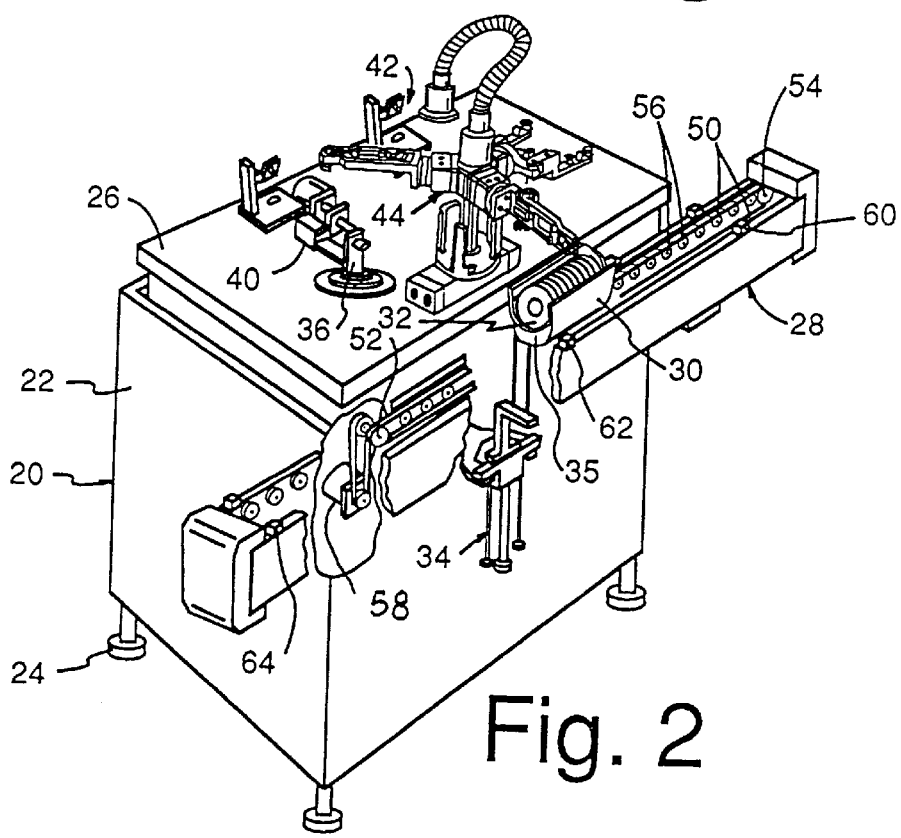
FIG. 2 is a perspective view illustrating a disk texturing apparatus in accordance with a preferred embodiment of the present invention.

Referring now to FIG. 2 of the drawing, a laser texturing apparatus in accordance with a preferred embodiment of the present invention is shown at 20 and includes a cabinet 22 supported on four adjustable legs 24 and having a top forming an upper work surface 26. Affixed to the front of cabinet 22 is a conveyer mechanism 28 for transporting and positioning cassettes 30 carrying disks 32 to be processed. Disposed beneath conveyer 28 is a disk-lifting mechanism 34 used to raise disks 32 out of cassette 30 and to a staging position above the cassette and conversely to receive disks when in its raised position and lower the disks into position within an empty slot of cassette 30. Disposed upon the cabinet top 26 are a pair of spindles 36 and 38 (spindle 38 being shielded from view in this illustration) for rotating the disks during the texturing operation a pair of laser beam directing and focusing assemblies 40 and 42, and a disk-transport (handler) mechanism 44.

As is apparent from this partially broken drawing, conveyer 28 includes a pair of bands or belts 50 stretched across a drive pulley 52 and an idler pulley 54, and supported by idler wheels 56. Pulley 52 is belt-driven by a stepper motor 58 disposed within cabinet 22. Disposed along conveyer 28 are three optical detectors 60, 62 and 64 for detecting the positions of cassettes as they are moved along the conveyer. Detector 60 detects the presence of cassettes having untextured disks loaded onto the conveyer; detector 62 detects the position of a cassette the disks of which are in position to be off-loaded for texturing and then reloaded into an empty slot within the cassette; and detector 64 is disposed at the downstream end of the conveyer for detecting cassettes carrying textured disks ready to be off-loaded from the conveyer.

In FIGS. 3 and 4 a front view and a cross-section taken along the line 4—4 in FIG. 3 are respectively depicted to further illustrate details and operation of the conveyer mechanism 28 and disk-lifting mechanism 34. As is apparent from these figures when taken in conjunction with FIG. 2, a disk-carrying cassette introduced to the conveyer at 29 will be detected by the detector 60. Actuation of motor 50 will then cause conveyer 28 to transport the cassette into the position 27 where its first slot 33 is positioned directly above the lift head 35 of lift mechanism 34. It will be appreciated that the cassettes 30 are of standard design and are open at the bottom so that a lift mechanism such as head 35 can pass into the bottom of the cassette, engage the bottom of a disk positioned thereabove, and then upon extension of the lift mechanism, raise the disk into the position illustrated at 32 clear of the cassette. As is apparent in the enlarged balloon view, a photosensor 66 contained within the head 35 will sense engagement of the head with the disk 32 and report same to the system via an electrical conductor 68. Similarly, with the head 35 in its raised position 35', a disk may be loaded thereonto and captured within a slot 69 for subsequent lowering into an empty slot within cassette 30. As will be described further below, motor 58 can be used to increment cassette 30 along conveyer 28 so as to align each disk within the cassette with the head 35 such that it can be removed therefrom and textured. After all the disks contained within cassette 30 have been textured and returned, the cassette can then be driven leftward by the conveyer and off-loaded onto the idler rollers 70 for detection by the detector 64 and subsequently off-loaded.

FIG. 5 is an elevational view depicting a spindle 36 and an optical assembly 40 for positioning a laser beam 72 generated by a laser 74 onto the bottom side of a disk 32 mounted on spindle 36. Spindle 36 is of conventional configuration and includes a precision disk-receiving support surface 76 for engaging the disk 32 and maintaining the lower surface thereof at a fixed elevation above top 26 as it is rotated. Spindle 36 is driven by a conventional drive motor 78 disposed within cabinet 22. The laser beam directing system 40 includes a 90° reflector 80 for directing the beam 72 toward the spindle 36 and through focusing optics 82. After convergence focusing, the beam is reflected by a second 90° reflector 84 and directed onto he lower surface of disk 32. The lens system 82 and reflector 84 are mounted to a precision stage 86 that is driven by a stepper motor 88 and lead screw 90 along(a line generally radial to spindle 36. A vernier adjustment 92 facilitates set-up of the stage position, and a hard stop 94 is provided for limiting the inward travel of the stage 86. As suggested by the arrow 96, radial movement of the beam relative to disk 32 within predetermined limits will permit determination of the width of the textured band to be produced on the bottom of disk 32. Note that since the bottom surface of disk 32 remains at a fixed distance from cabinet surface 26, because of its engagement with spindle surface 76 and since reflector 84 remains at fixed distances from both the focusing lens 82 and the bottom surface of disk 32, its focus will remain constant as it is swept radially relative to the disk.

Figure 6:
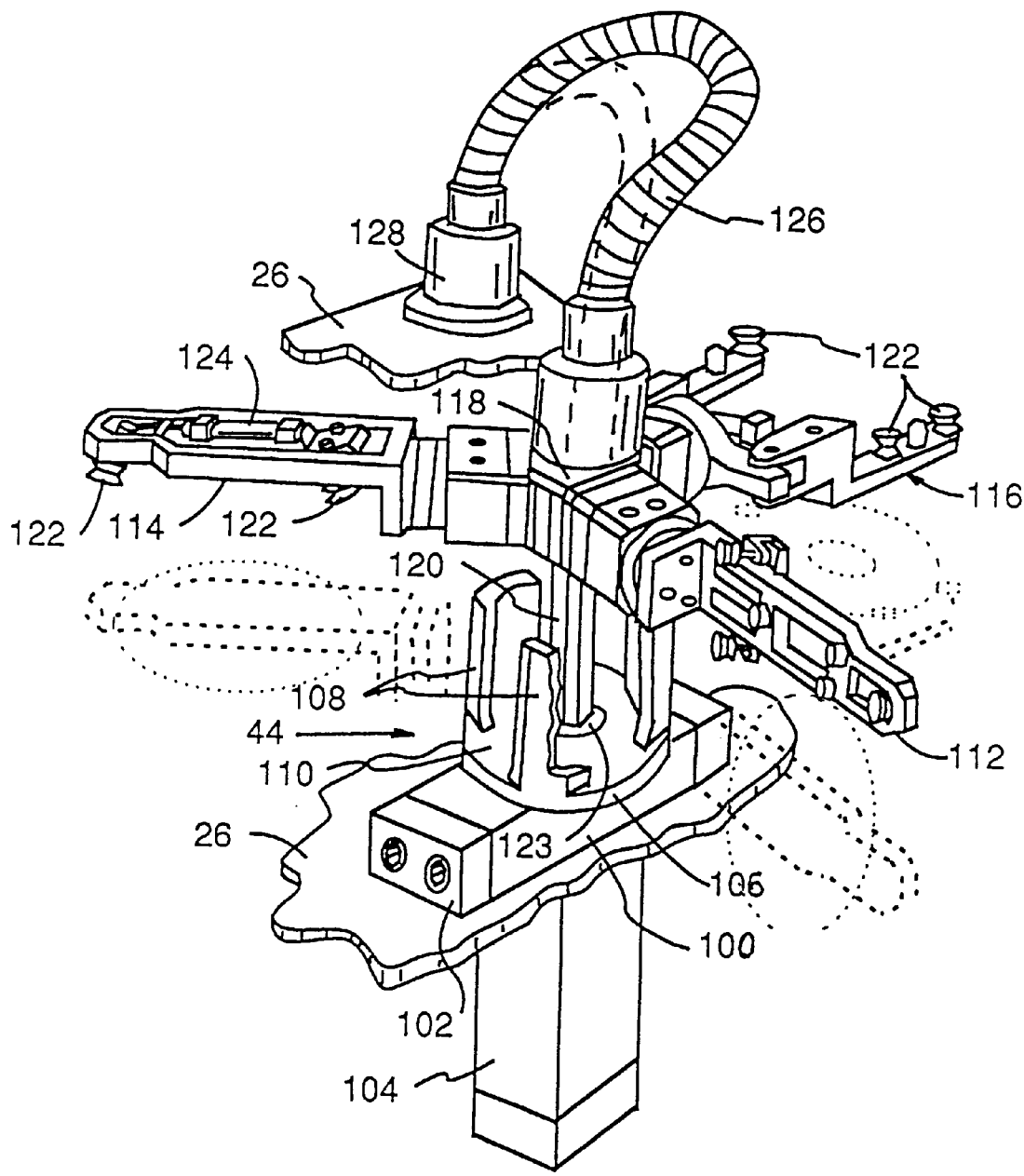
FIG. 6 is a perspective view illustrating the disk-handling and transfer mechanism of FIG. 2.

Turning now to FIG. 6, a more detailed description of the disk transfer mechanism 44 will be given. As is apparent from the drawing, the transfer mechanism includes a base 100 having a horizontally extending component 102 and a vertically extending component 104. Positioned above component 102 is an alignment jig 106 having three upstanding risers 108 equally spaced around the perimeter of a circular base 110 with the lateral edges of the risers 108 forming guide slots for receiving and hard-positioning three disk-manipulating arms 112, 114, and 116. The arms are carried by a central hub 118 that is attached to the distal end of a shaft 120 that passes through a rotary collar 123 and into engagement with a lift mechanism (not shown) contained within the member 104.

The lift mechanism is typically a pneumatic actuator and serves to raise and lower the hub 118 and its associated arms 112, 114, 116 between a lower position indicated by the dashed lines and an upper position indicated by the solid lines. The collar 123 is associated with a rack and pinion or other suitable type of electrical or pneumatic actuator disposed within member 102 and operative to alternately rotate collar 123 120° clockwise and counterclockwise. Shaft 120 is preferably splined or of polygonal cross-section and passes through a mating opening in collar 123 so as to allow it to be axially displaced relative to collar 123 but rotationally driven therewith.

Accordingly, with the transport assembly in its lowered position, the proximate ends of the arms 112, 114, 116 will be nestled between the risers 108 and held in precision alignment thereby. Upon actuation of the lift mechanism in 104, the assembly will be driven into its upper position whereupon, in response to the actuation of the mechanism in 102, the assembly will be rotated 120° and, upon being lowered, it will again nest within the risers 108 and again be precision oriented in its new disposition.

As will further be described below, each of the arms 112, 114, 116 includes a plurality of disk-engaging rollers or other resilient fingers 122 which are pivotally connected to an electrical or pneumatic actuator 124 that, in its retracted configuration, causes the rollers to spread relative to each other wide enough to receive the perimeter of a disk therebetween and, in its extended configuration, causes the rollers to close upon the perimeter of the disk and grippingly engage same so that it can be carried by the transport assembly.

Attached to the top of hub 118 is one end of an umbilical cord 126 having its opposite end 128 connected to the cabinet top 26 and functioning to provide a flexible conduit through which electrical and/or pneumatic sensors and control lines may be passed.

Figure 7:
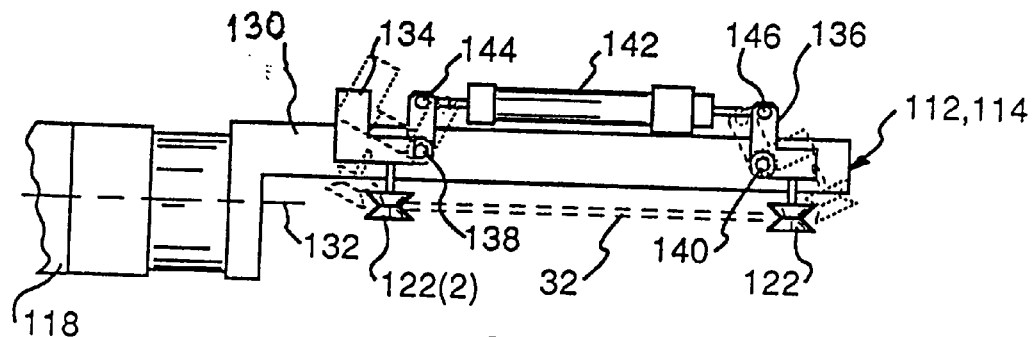
FIG. 7 is a side elevational view showing details of a first type of disk-manipulating arm included in the handling mechanism of FIG. 6.

For reasons that will become apparent, two types of disk-gripping configurations are required for the arms 112, 114, 116, the first of which is illustrated in more detail in FIG. 7. As depicted, the arms 112 and 114 include a frame 130 that is rotationally secured to the hub 118 and is rotatable by at least 90° about an axis 132 by a suitable stepping motor or other actuator contained within the hub 118. As shown, three roller-type grippers 122 are suspended from bell-crank-shaped members 134 and 136 pivotally secured to frame 130 and respectively rotatable about shafts 138 and 140. The opposite ends of a pneumatic actuator 142 are secured to cranks 134 and 136 at 144 and 146, respectively, such that, in the deactivated or unpressurized state, actuator 142 causes the grippers 122 to be spread outwardly into their position shown in dashed lines, and when actuated or pressurized, causes the rollers to close toward each other to grippingly engage the perimeter of a disk represented by the dashed lines 32.

Figure 8:
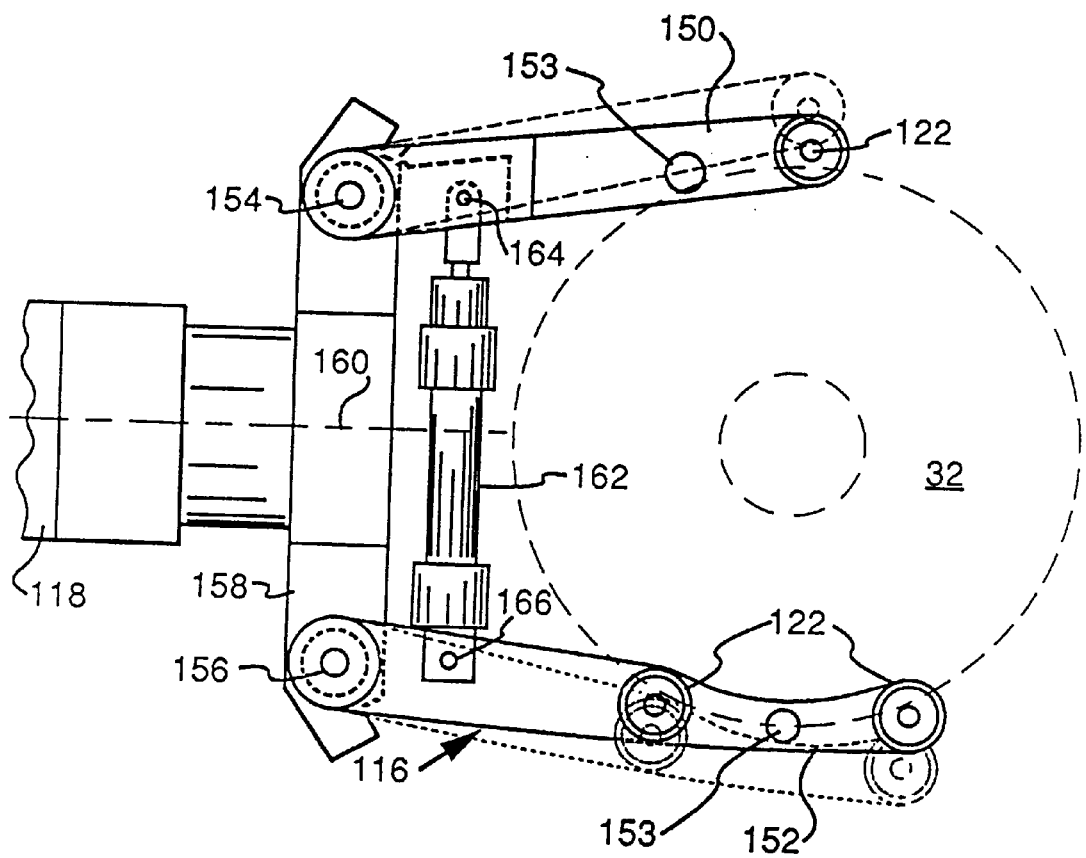
FIG. 8 is a plan view illustrating details of a second type of disk-manipulating arm included in the transfer mechanism of FIG. 6.

The second general type of disk-gripping arm is that designated 116 in FIG. 6 and further depicted in FIG. 8. This configuration includes a pair of elongated arms 150 and 152 having rollers 122 variously affixed thereto, as indicated, proximate one end of each arm. Also affixed to each arm is a resilient button 153 that engages the disk edge and damps out any disk vibration or chatter as it engages the spindle tops. The opposite end of each arm is pivotally secured at 154 and 156, respectively, to a base 158 that is rotatably secured to hub 118 and adapted to be rotated 180° about an axis 160 by a suitable motor or pneumatic actuator disposed within hub 118. As indicated by the dashed lines, the arms 150 and 152 may be spread and retracted by an electrical or pneumatic actuator 162 having opposite ends thereof secured to the arms 150 and 152 at 164 and 166, respectively. As in the case of the arms 112, 114. actuation of the actuator enables engagement of a disk so that it may be transported from one position to another.

It will thus be appreciated that this gripping mechanism, like that of FIG. 7, provides a relatively simple structure for gripping, carrying and re-orienting a disk 32. As will be further explained below, the principal functional differences between the two configurations are that the gripper of FIG. 7 is specifically intended to engage either a horizontally disposed disk or a vertically disposed disk and can rotate the disk 90° between a horizontal disposition and a vertical disposition, or vice versa. On the other hand, a gripper of the type disclosed in FIG. 8 is adapted to engage only horizontally disposed disks, but can do so in either of two horizontal dispositions rotated 180° about the axis 160. This is to say that the gripper 116 can pick up a horizontally disposed disk on one spindle and flip it top to bottom as the gripper is rotated 180° about the axis 160 and then deposit it in its inverted configuration onto a second spindle.

Referring now to FIGS. 9a, 9b, and 9c, the transport mechanism 44 is shown in FIG. 9a poised to pick up a first disk D1 disposed on spindle 36 at a third station III, and a second disk D2 disposed on spindle 38 at a second station II. A third disk D3 is shown at station I ready for pick-up from the cassette 30.

In FIG. 9b, the transport mechanism 44 is shown rotating counterclockwise during which rotation it will rotate 120° and cause arm 112 to deliver disk D3 to spindle 38 at station II. while arm 116 carries disk D2 from spindle 38 at station II to spindle 36 at station III, and arm 114 carries disk D1 to station I where it will be reloaded back into the empty cassette slot now occupied by lifter head 35. Note that, prior to positioning disk D3 on spindle 38, arm 112 will rotate disk D3 90° from the vertical disposition illustrated into a horizontal disposition; arm 116 will rotate disk D2 (with one side textured) 180° from the illustrated horizontal disposition to an inverted horizontal disposition before loading it onto spindle 36 at station III, and arm 114 will rotate disk D1 (with both sides textured) 90° from the illustrated horizontal position to a vertical position so that it can be loaded onto head 35 at station I and, after release, be lowered into cassette 30.

In FIG. 9c, the transfer mechanism 44 is shown rotating clockwise back into its starting position during which time texturing of the bottom sides of disks D2 and D3 is conducted and stage 30 is incremented one position so that a disk D4 is presented to lifting head 35. The cycle then repeats itself and continuously transports, positions and textures disks in sequential fashion, replacing each disk removed from cassette 30 with a fully textured disk during the time that opposite sides of two different disks are being respectively textured.

The following lists the sequence of operative steps followed by the apparatus of the preferred embodiment:

Operational Sequence

1. Transport assembly up.
2. Gripper 112 vertical, gripper 114 horizontal down, gripper 116 horizontal down.

3. Open grippers 112, 114 and 116.
4. Index cassette to place first disk above lifter head 35.
5. Raise litter to top.
6. Close grippers 112, 114, 116.
7. Lower disk litter.
8. Raise transport mechanism.
9. Rotate transport mechanism 120° counterclockwise.
10. Rotate gripper 112 90°; rotate gripper 114 90°; rotate gripper 116 180°.
11. Lower transport mechanism.
12. Raise disk lifter.
13. Open grippers 112, 114, 116.
14. Lower disk lilter.
15. Raise transport mechanism.
16. Rotate transport mechanism 120° clockwise.
17. Start spindles 36, 38.
18. Actuate laser and stepper motor.
19. Turn off laser and laser stepper.
20. Stop spindles 36 and 38.
21. Lower transport mechanism.
22. Backward index cassette by two disk positions (to disk D1 slot).
23. Raise disk lifter.
24. Close grippers 112, 114. 116.
25. Lower disk lifter.
26. Raise transport mechanism.
27. Index cassette to place next disk (disk D4) above lifter head 35.
28. Repeat steps 9–27.

Although the present invention has been described above in terms of specific embodiments, it is anticipated that alterations and modifications thereof will no doubt become apparent to those skilled in the art. For example, it is conceivable that the rotary transport mechanism described above could alternatively be implemented in terms of a linearly moving reciprocal shuttle having gripping, lifting and rotating arms carried thereby It is therefore intended that the following claims be interpreted as covering all such alterations and modifications is fall within the true spirit and scope of the invention.

What is claimed is:

1. Apparatus for texturing magnetic recording disk substrates, comprising:
    first spindle means for receiving a disk to be textured;
    second spindle means for subsequently receiving said disk to be textured, said second spindle means being positioned at a predetermined location relative to said first spindle means;
    first laser texturing means disposed relative to said first spindle means and operative to perform texturing operations on one side of said disk when it is mounted to said first spindle means;
    second laser texturing means disposed relative to said second spindle means and operative to perform texturing operations on a second side of said disk when it is mounted to said second spindle means; and
    disk transport means operative to move said disk from said first spindle means to said second spindle means and to place a second disk on said first spindle means, wherein during a single texturing cycle different sides of disks mounted on said first and second spindle means are simultaneously textured.

2. Apparatus for texturing magnetic recording disk substrates as recited in claim 1, wherein said first disk is inverted before being positioned on said second spindle means.

3. Apparatus for texturing magnetic recording disk substrates as recited in claim 1, further including a conveyer means disposed relative to said disk transport means for transporting and positioning said disks.

4. Apparatus for texturing magnetic recording disk substrates as recited in claim 3, further including:
    first sensor means disposed on one end of said conveyer means for detecting the presence of a cassette having untextured disks loaded therein;
    second sensor means disposed at a downstream end of said conveyer means for detecting the presence of a cassette carrying textured disks to be off-loaded from said conveyer means; and
    third sensor means disposed between said first and second sensor means for detecting the presence of a cassette wherein disks are in position to be off-loaded for texturing.

5. Apparatus for texturing magnetic recording disk substrates as recited in claim 1, further including a disk supply means positioned at a predetermined location relative to said first and second spindle means.

6. Apparatus for texturing magnetic recording disk substrates as recited in claim 5, wherein said disk supply means includes a cassette for carrying disks to be textured.

7. Apparatus for texturing magnetic recording disk substrates as recited in claim 6, further including:
    disk lifting means positioned at a predetermined location relative to said disk transport means for removing a disk to be textured from said cassette, including:
        a lift head to raise a disk to be textured to a position clear of said cassette; and
        sensor means contained within said lift head to sense engagement of said head with a disk.

8. Apparatus for texturing magnetic recording disk substrates as recited in claim 7, wherein a disk may be loaded into said lift head when said lift head is in an extended position.

9. Apparatus for texturing magnetic recording disk substrates as recited in claim 7, wherein said disk transport means further including:
    a base having a vertically extending member;
    a shaft contained within said vertically extending member;
    a central hub attached to a distal end of said shaft;
    a plurality of disk manipulating arms being carried by said hub; and
    arm alignment means having a plurality of risers spaced around an alignment means base member for receiving said disk manipulating arms.

10. Apparatus for texturing magnetic recording disk substrates as recited in claim 9, wherein said base is rotatable through an angle of 120° to cause a first arm to deliver a second disk from said first spindle means to said second spindle means, a second arm to deliver a first disk from said second spindle means to said disk supply means, and a third arm to deliver a third disk from the disk supply means to said first spindle means.

11. Apparatus for texturing magnetic recording disk substrates as recited in claim 10, wherein said third arm rotates said third disk 90° from a vertical disposition into a horizontal disposition before positioning said third disk on said first spindle means.

12. Apparatus for texturing magnetic recording disk substrates as recited in claim 10, wherein said first arm rotates said second disk 180° from a first horizontal disposition into a second horizontal disposition before positioning said second disk on said second spindle means.

13. Apparatus for texturing magnetic recording disk substrates as recited in claim 10, wherein said second arm rotates said first disk 90° from a horizontal disposition into a vertical disposition before positioning said first disk onto said disk supply means.

14. Apparatus for texturing magnetic recording disk substrates, comprising:
   first spindle means for receiving a disk to be textured;
   second spindle means for subsequently receiving said disk to be textured, said second spindle means being positioned at a predetermined location relative to said first spindle means;
   first laser texturing means disposed relative to said first spindle means and operative to perform texturing operations on one side of said disk when it is mounted to said first spindle means;
   second laser texturing means disposed relative to said second spindle means and operative to perform texturing operations on a second side of said disk when it is mounted to said second spindle means; and
   disk supply means positioned at a predetermined location relative to said first and second spindle means; and
   disk transport means operative to simultaneously remove a first disk from said second spindle means, remove a second disk from said first spindle means, receive a third disk from said supply means, whereby during a texturing cycle a first side of said second disk is textured, and a second side of said first disk is textured.

15. Apparatus for texturing magnetic recording disk substrates as recited in claim 14, wherein said disk transport means is operating to simultaneously return said first disk to said supply means. deposit said second disk on said second spindle means, and deposit said third disk on said first spindle means.

16. Apparatus for texturing magnetic recording disk substrates as recited in claim 15, wherein said second disk is inverted before being positioned on said second spindle means.

17. Apparatus for texturing magnetic recording disk substrates as recited in claim 14. wherein said disk supply means includes a cassette for carrying disks to be textured.

18. Apparatus for texturing magnetic recording disk substrates as recited in claim 17, further including:
   disk-lifting means positioned at a predetermined location relative to said disk transport means for removing a disk to be textured from said cassette, including:
      an extendable lift head for raising a disk to be textured to a position clear of said cassette; and
      a sensor means contained within said lift head to sense the engagement of said head with a disk.

19. Apparatus for texturing magnetic recording disk substrates as recited in claim 18, wherein a disk may be loaded into said lift head when said lift head is in an extended position.

20. Apparatus for texturing magnetic recording disk substrates as recited in claim 14, further including a conveyer means disposed relative to said disk transport means for transporting and positioning said disk supply means.

21. Apparatus for texturing magnetic recording disk substrates as recited in claim 20, further including:
   first sensor means disposed on one end of said conveyer means for detecting the presence of a cassette having untextured disks loaded therein;
   second sensor means disposed at a downstream end of said conveyer means for detecting the presence of cassettes carrying textured disks to be off-loaded from said conveyer; and
   third sensor means disposed between said first sensor means and said second sensor means for detecting the presence of a cassette wherein disks are in position to be off-loaded for texturing.

22. Apparatus for texturing magnetic recording disk substrates as recited in claim 21, wherein said disk transport means further comprises:
   a base having a vertically extending member;
   a shaft contained within said vertically extending member;
   a central hub attached to a distal end of said shaft;
   a plurality of disk manipulating arms being carried by said hub, said arms being separated by 120° angle between each of said arms; and
   an alignment means having a plurality of risers spaced around the perimeter of a an alignment means base member and being disposed on said base for receiving said disk manipulating arms.

23. Apparatus for texturing magnetic recording disk substrates as recited in claim 22, wherein said base is rotatable through an angle of 120° to cause a first arm to deliver a second disk from said first spindle means to said second spindle means, a second arm to deliver a first disk from said second spindle means to said disk supply means, and a third arm to deliver a third disk from the disk supply means to said first spindle means.

24. Apparatus for texturing magnetic recording disk substrates as recited in claim 23, wherein said third arm rotates said third disk 90° from a vertical disposition into a horizontal disposition before positioning said third disk on said first spindle means.

25. Apparatus for texturing magnetic recording disk substrates as recited in claim 24, wherein said first arm rotates said second disk 180° from a first horizontal disposition into a second horizontal disposition before positioning said second disk on said second spindle means.

26. Apparatus for texturing magnetic recording disk substrates as recited in claim 25, wherein said second arm rotates said first disk 90° from a horizontal disposition into a vertical disposition before positioning said first disk onto said lift head.

27. Apparatus for texturing magnetic recording disk substrates, comprising:
   spindle means for receiving a disk to be textured;
   laser beam directing means for positioning a laser beam generated by a laser onto one surface of the disk to be textured, including:
      a precision stage driven by a motor along a line generally radial to said spindle means;
      lens means mounted on said precision stage for convergence focusing of the laser beam; and
      a reflector mounted on said precision stage for directing the converged laser beam onto the surface of the disk;
   stop means linearly positioned between said spindle means and said laser beam directing means for limiting the travel of said stage toward said spindle means; and
   whereby radial movement of the laser beam relative to the disk within predetermined limits determines the width of texture a band to be produced on the disk.

28. Apparatus for texturing magnetic recording disk substrates as recited in claim 27, further including adjustment means for setting-up position for said precision stage.

29. Apparatus for texturing magnetic recording disk substrates as recited in claim 27, wherein said spindle means includes a disk receiving support means for engaging the disk and maintaining the disk surface to be textured at a fixed distance from said laser beam directing means as said spindle rotates.

30. Apparatus for manipulating and transporting disks for texturing, comprising:
   a base having a horizontally extending member and a vertically extending member;
   a shaft contained within the vertically extending membe;
   a central hub attached to a distal end of said shaft;
   a plurality of disk manipulating arms carried by said central hub; and
   an alignment means having a plurality of risers for receiving said disk manipulating arms.

31. Apparatus for manipulating and transporting disks for texturing as recited in claim 30, wherein said risers include edges that define guide slots wherein said disk manipulating arms are received and positioned.

32. Apparatus of a transport for manipulating and transporting disks for texturing as recited in claim 30, further including:
   lift means being engaged with said shaft, said lift means functioning to raise and lower said hub and its associated disk manipulating arms; and
   a rotary collar disposed within said horizontally extending member and operative to alternately rotate said hub at a predetermined angle clockwise and counterclockwise.

33. Apparatus for manipulating and transporting disks for texturing as recited in claim 30, wherein each of said disk-manipulating arm further includes:
   actuator means being positioned at a predetermined location on said arm; and
   a plurality of gripper means which are pivotally connected to said actuator means, said actuator means in one state, causing said gripper means to be able to receive a disk therebetween and, in another state, causing said gripper means to grippingly engage the disk.

34. Apparatus for manipulating and transporting disks for texturing as recited in claim 30, wherein one of said disk manipulating arms further includes:
   a frame rotationally secured to said hub and rotatable by a predetermined angle about an axis;
   actuator means disposed on said frame;
   a plurality of arm shafts coupled to said frame;
   a plurality of crank member means pivotally coupled to said frame via said arm shafts respectively, said crank member means being rotatable about said arm shafts; and
   a plurality of gripper means suspended from said crank member means, wherein opposite ends of said actuator means are secured to an associated crank member means, such that when said actuator means is deactivated, said actuator means causes said gripper means to spread for receiving a disk, and when said actuator means is activated it causes said gripper means to close toward each other to grippingly engage a disk.

35. Apparatus for manipulating and transporting disks for texturing as recited in claim 34, wherein said gripper means are intended to engage a horizontally disposed disks.

36. Apparatus for manipulating and transporting disks for texturing as recited in claim 34, wherein said gripper means are intended to engage a vertically disposed disk.

37. Apparatus for manipulating and transporting disks for texturing as recited in claim 34, wherein said frame rotates 90° about the axis between a horizontal disposition and a vertical disposition.

38. Apparatus for manipulating and transporting disks for texturing as recited in claim 30, wherein one of said disk-manipulating arm further comprises:
   a base rotatably secured to said hub and adapted to be rotated at a predetermined angle about an axis by a suitable actuator means;
   a pair of elongated arms;
   first gripper means affixed proximate one end of each arm and a second gripper means affixed to one of said arms, wherein an opposite end of each arm is pivotally secured to opposite ends of said base, such that said pair of arms may be spread and retracted when the actuator means is deactivated of activated to receive or grippingly engage a disk.

39. Apparatus for manipulating and transporting disks for texturing as recited in claim 38, wherein said gripper means are intended to engage a horizontally disposed disk.

40. Apparatus for manipulating and transporting disks for texturing as recited in claim 38, wherein said frame rotates 180° about the axis.

41. Apparatus for manipulating and transporting disks for texturing as recited in claim 38, wherein each elongated arm includes a resilient means that engages the disk edge to damp out any disk vibration.

42. Apparatus for manipulating and transporting disks for texturing as recited in claim 30, wherein said plurality of disk-manipulating arms include three arms separated by an angle of 120° between each arms.

43. A method for texturing magnetic recording disk substrates, each of said disks having a first side and an opposite second side, comprising the steps of:
   loading a first disk upon a second spindle, said first disk having its first side textured;
   loading a second disk upon a first spindle;
   texturing the second side of said first disk; and
   texturing the first side of said second disk, said texturing steps of said first and second disks being conducted simultaneously.

44. A method for texturing magnetic recording disk substrates as recited in claim 43, including the further steps of:
   transporting said first disk to a completed disk holding device following the completion of said texturing step of said second side of said first disk;
   transporting said second disk to said second spindle and loading it thereon following said step of texturing said first side of said second disk; and
   transporting a third disk to said first spindle and loading it thereon, each said transporting step being conducted simultaneously.

45. A method for texturing magnetic recording disk substrates as recited in claim 44, including the further steps of:
   texturing the second side of said second disk while it is loaded upon said second spindle; and
   texturing a first side of said third disk while it is loaded upon said first spindle, said texturing steps being performed simultaneously.

46. A method for texturing magnetic recording disk substrates as recited in claim 44, wherein said step of transporting a disk from said first spindle means to said second spindle means includes the further step of rotating said disk through a 180° angle.

47. A method for texturing magnetic recording disk substrates as recited in claim 44, wherein said steps of transporting said disks are accomplished utilizing a disk transport means having a plurality of arm members, each said arm member having a disk gripping means disposed at an end thereof.

48. A method for texturing magnetic recording disk substrates as recited in claim 47, wherein said disk transport means further includes a hub member, and wherein said arms are engaged at an end thereof to said hub member, and wherein said arms are separated by an angle of approximately 120° between each arm.

49. A method for texturing magnetic recording disk substrates as recited in claim 48, wherein said hub member is rotated through an angle of approximately 120° during each said transportation step.

50. A method for texturing magnetic recording disk substrates, comprising the steps of:

loading a first disk upon a first spindle;

texturing a first side of said first disk;

loading said first disk upon a second spindle;

texturing a second side of said first disk;

loading a second disk upon said first spindle; and texturing a first side of said second disk, said steps of texturing said first and second disks being conducted simultaneously.

51. A method for texturing magnetic recording disk substrates as recited in claim 50, further comprising the steps of:

transporting said first disk to a holding device following completion of said step of texturing said second side of said first disk;

transporting said second disk to said second spindle and loading it thereon following said step of texturing said first side of said second disk; and transporting a third disk to said first spindle and loading it thereon, each of said transporting steps being conducted simultaneously.

* * * * *